US012475302B2

(12) United States Patent
Liu et al.

(10) Patent No.: US 12,475,302 B2
(45) Date of Patent: *Nov. 18, 2025

(54) CUSTOM DISPLAY POST PROCESSING IN SPEECH RECOGNITION

(71) Applicant: Microsoft Technology Licensing, LLC, Redmond, WA (US)

(72) Inventors: Wei Liu, Beijing (CN); Padma Varadharajan, San Jose, CA (US); Piyush Behre, Santa Clara, CA (US); Nicholas Kibre, Redwood City, CA (US); Edward C. Lin, Beijing (CN); Shuangyu Chang, Davis, CA (US); Che Zhao, Beijing (CN); Khuram Shahid, Woodinville, WA (US); Heiko Willy Rahmel, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/764,129

(22) Filed: Jul. 3, 2024

(65) Prior Publication Data

US 2024/0403539 A1 Dec. 5, 2024

Related U.S. Application Data

(63) Continuation of application No. 17/815,211, filed on Jul. 26, 2022, now Pat. No. 12,061,861.

(30) Foreign Application Priority Data

Apr. 29, 2022 (WO) ................ PCT/CN2022/090154

(51) Int. Cl.
*G06F 40/151* (2020.01)
*G06F 40/117* (2020.01)
(Continued)

(52) U.S. Cl.
CPC .......... *G06F 40/151* (2020.01); *G06F 40/117* (2020.01); *G06F 40/166* (2020.01); *G06F 40/284* (2020.01)

(58) Field of Classification Search
None
See application file for complete search history.

(56) References Cited

U.S. PATENT DOCUMENTS 11,636,266 B2 * 4/2023 Pappu ................. G06F 16/3344
704/9
2005/0108010 A1 * 5/2005 Frankel ................. G06F 40/103
704/235

(Continued)

*Primary Examiner* — Ariel Mercado-Vargas
(74) *Attorney, Agent, or Firm* — Barta Jones, PLLC

(57) ABSTRACT

Solutions for custom display post processing (DPP) in speech recognition (SR) use a customized multi-stage DPP pipeline that transforms a stream of SR tokens from lexical form to display form. A first transformation stage of the DPP pipeline receives the stream of tokens, in turn, by an upstream filter, a base model stage, and a downstream filter, and transforms a first aspect of the stream of tokens (e.g., disfluency, inverse text normalization (ITN), capitalization, etc.) from lexical form into display form. The upstream filter and/or the downstream filter alter the stream of tokens to change the default behavior of the DPP pipeline into custom behavior. Additional transformation stages of the DPP pipeline perform further transforms, allowing for outputting final text in a display format that is customized for a specific user. This permits each user to efficiently leverage a common baseline DPP pipeline to produce a custom output.

20 Claims, 9 Drawing Sheets

(51) Int. Cl.
*G06F 40/166* (2020.01)
*G06F 40/284* (2020.01)

(56) References Cited

U.S. PATENT DOCUMENTS

| | | | |
|---|---|---|---|
| 2008/0215320 A1* | 9/2008 | Wu | G10L 15/22 |
| | | | 704/E15.044 |
| 2015/0309974 A1* | 10/2015 | Brav | G06F 16/93 |
| | | | 715/256 |
| 2019/0065462 A1* | 2/2019 | Salloum | G06F 40/44 |
| 2019/0108834 A1* | 4/2019 | Nelson | G06F 40/58 |
| 2019/0278841 A1* | 9/2019 | Pusateri | G06F 40/151 |
| 2021/0383249 A1* | 12/2021 | Goyal | G06F 40/284 |

* cited by examiner

FIG. 3

| | |
|---|---|
| LEXICAL FORM 202 | well well g-----n too day is may twenty seven period |
| Disfluency 310 | well g-----n too day is may twenty seven period |
| ITN 320 | well g-----n too day is 5/27 period |
| Reformulation 330 | well g-----n today is 5/27 period |
| Capitalization 340 | Well g-----n today is 5/27 period |
| Profanity 350 | Well *** today is 5/27 period |
| EXPLICIT PUNCTUATION 260 | Well *** today is 5/27. |

CUSTOM DISPLAY POST PROCESSING IN SPEECH RECOGNITION

CROSS-REFERENCE TO RELATED APPLICATION

This application is a continuation application of and claims priority to U.S. patent application Ser. No. 17/815,211 (U.S. Pat. No. 12,061,861), entitled "CUSTOM DISPLAY POST PROCESSING IN SPEECH RECOGNITION," filed on Jul. 26, 2022, which claims priority to PCT Application No. PCT/CN22/90154, filed on Apr. 29, 2022, the disclosures of which are incorporated herein by reference in their entireties.

BACKGROUND

Speech services typically use a two-phase approach: speech recognition and display post processing (DPP). Speech recognition (SR) outputs the recognized speech in lexical form and DPP transforms the lexical form input to display form (e.g., natural language form) to improve readability. For example, the lexical language form "january one nineteen eighty" (as may be output by SR) is more readily-understandable by humans when presented as "January 1, 1980" in a displayed transcript.

However, different users may prefer different display form versions, such as dates rendered as "January 1, 1980" versus "January $1^{st}$, 1980" or "1/1/1980" (or even "01/01/1980"). Other categories of lexical to display form transformation, such as disfluency (e.g., removing "uhh" and "um"), capitalization, and punctuation may also be subject to differing user preferences. A one-size-fits-all DPP will therefore not satisfy all user preferences, and generating a different DPP engine for each potential combination of user preferences is resource inefficient.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Example solutions for custom display post processing (DPP) in speech recognition (SR) include: receiving, by a customized multi-stage DPP pipeline, a stream of tokens, each token representing an element of human speech in a lexical form; for a first transformation stage of the DPP pipeline, receiving the stream of tokens, in turn, by a first upstream filter, a first base model stage, and a first downstream filter, and: transforming, by the first base model stage, a first aspect of the stream of tokens from lexical form into display form; and altering, by the first upstream filter and/or the first downstream filter, the stream of tokens; receiving, by a second transformation stage of the DPP pipeline, from the first transformation stage, the stream of tokens; transforming, by the second transformation stage, a second aspect of the stream of tokens from lexical form into display form; and based on at least transforming multiple aspects of the stream of tokens, outputting a final text representing the stream of tokens.

BRIEF DESCRIPTION OF THE DRAWINGS

The disclosed examples are described in detail below with reference to the accompanying drawing figures listed below:

FIG. 3 illustrates exemplary text changes during various stages of the DPP pipeline of FIG. 2;

Corresponding reference characters indicate corresponding parts throughout the drawings.

DETAILED DESCRIPTION

Figure 1:
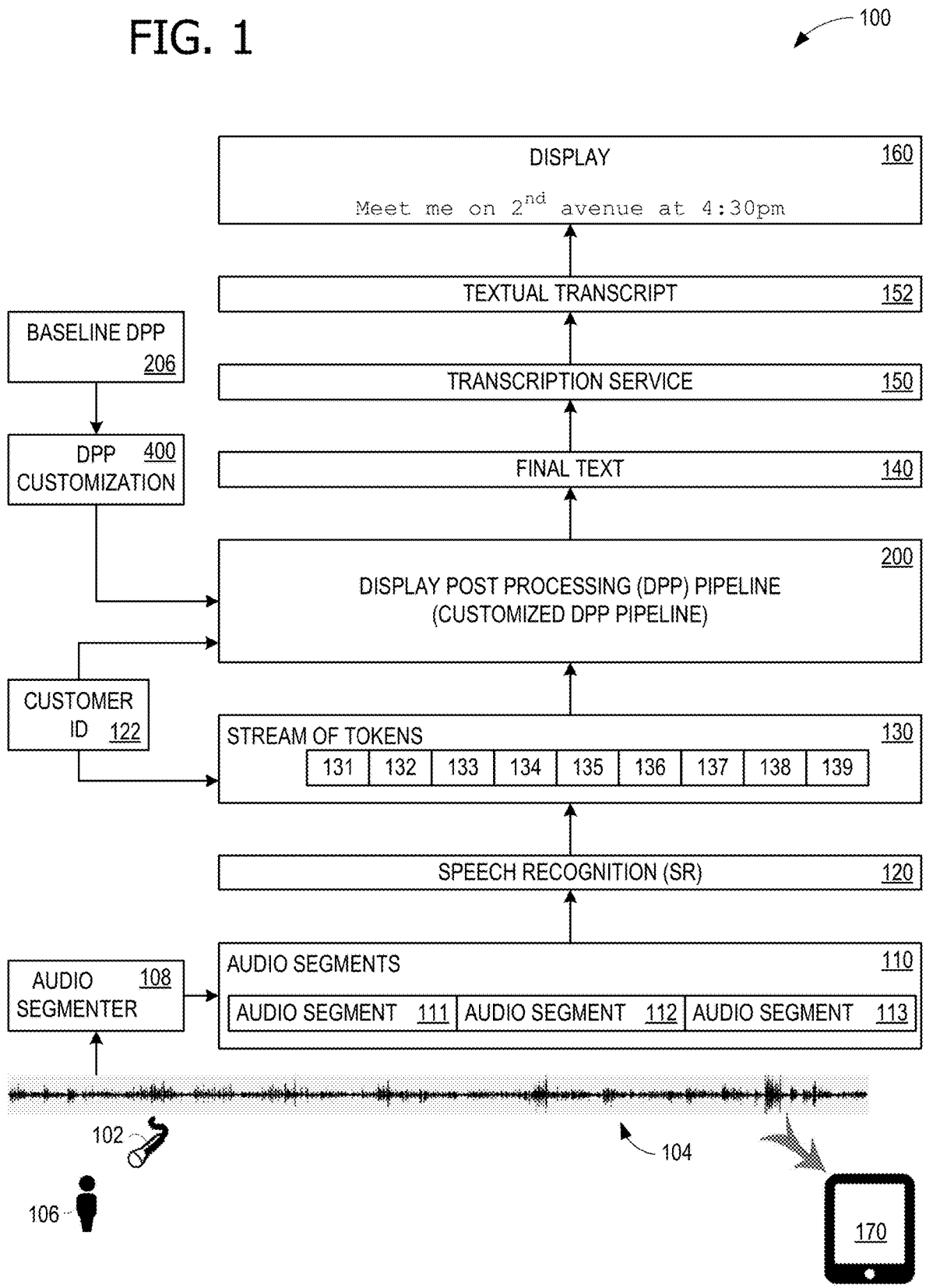
FIG. 1 illustrates an example arrangement that advantageously provides custom display post processing (DPP) in speech recognition (SR)

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

A display post processing (DPP) pipeline typically alters speech recognition (SR) output in stages, such as with stages for the various tasks of: disfluency, inverse text normalization (ITN), capitalization, and punctuation. Text normalization is a process of transforming text into a single canonical form that it might not have had before, such as by replacing symbols with certain words, and possibly re-arranging the order and/or deleting punctuation. ITN, versus to text normalization, is a process of converting raw spoken output of an SR model into its written form to improve text readability. ITN is used to convert from common oral to common written representations, when they differ. For example, the words "five dollars" are replaced with a number ("5") replacing a word and a currency symbol ("$") replacing a word. The order is then swapped, because "$5" is the common written representation, rather than "5$".

A normalization category is a context that has a set of common text normalization rules. In the examples just provided, text normalization for currency has a different set of rules than text normalization for dates, and thus are separate normalization categories. Example normalization categories include address, location, time, date, currency, decimal, fraction, email, internet address, and math.

Example solutions for custom display post processing in SR use a customized multi-stage DPP pipeline that transforms a stream of SR tokens from lexical form to display form. A first transformation stage of the DPP pipeline receives the stream of tokens, in turn, by an upstream filter, a base model stage, and a downstream filter, and transforms a first aspect, portion, element, or the like, of the stream of tokens (e.g., disfluency, inverse text normalization (ITN), capitalization, etc.) from lexical form into display form. The upstream filter and/or the downstream filter alter the stream of tokens to change the default behavior of the DPP pipeline into custom behavior. Additional transformation stages of the DPP pipeline perform further transforms, allowing for outputting final text in a display format that is customized for a specific user. This permits each user to efficiently leverage a common baseline DPP pipeline to produce a custom output. The tokens described herein are SR tokens, which are a defined set of digital symbols that are each mapped to a recognized spoken word. In some examples, the tokens may be textual representations of the spoken words.

Aspects of the disclosure improve the operations of computing devices, efficiently tailoring output of complex SR and DPP processes at least by altering, by an upstream filter (upstream from a base DPP model stage) and/or a downstream filter, a stream of tokens representing an element of human speech in a lexical form. By using customized upstream/downstream filter pairs straddling one or more base DPP model stages, a single baseline DPP pipeline can be efficiently leveraged in a technological sense (e.g., efficient use of computing resources) to provide customized DPP for SR tasks, meeting unique user preferences. The upstream/downstream filter pairs straddling each DPP model stage permit altering DPP pipeline behavior, without changing the DPP model stages, by altering input to a stage and/or output from a stage. For example, certain tokens (e.g., words) may be tagged by an upstream filter prior to entering a particular DPP model stage, to instruct that stage to preserve a token, and the tag may be removed later by the downstream filter (which may further change the tagged token). In some examples, the filters are rules-based.

Users are able to customize filters (e.g., by generating scenario-specific rules) according to their own preferences (e.g., as a form of self-service), and link their customized filters to a baseline DPP pipeline to override default behaviors, thereby producing their own customized DPP pipeline. The users are able to accomplish this rapidly, on their own schedules, with reduced computing resource usage, precluding the need to wait for a developer of the DPP pipeline to use additional computing resources to create a custom version. With each user having their own customizations, which may be withheld from dissemination outside that user's account e.g., a particular organization's resources), user privacy is maintained and network bandwidth use is reduced (thereby improving the functioning of the underlying computing device). In this manner, a company may have its own customizations that are not shared with competitors. As an example, a company may use a certain format for internal project reference identifiers, such as "8B-EV-3", that the company prefers to keep as proprietary information. A baseline DPP pipeline may transform the spoken words "eight bee ee vee three" to "8 B E V 3" which is less helpful. Thus, the custom DPP pipeline has utility to the company (the user).

Some examples provide for rapid, simplified filter generation (e.g., streamlining use of computing resources) in which the user supplies a document, that has examples of the preferred display format, to use as a target. A disclosed DPP customization tool is able to generate the filter rules in order to match the customized DPP pipeline's output to the text forms in the target document. That is, the filters learn proper display form, given user-provided in-domain unique content that is specific to that user. Users are also able to use default behavior of the baseline DPP pipeline for selected stages, where desired. Examples provide for a per scenario and/or per class of user customization.

Some examples improve computing stability by permitting a user to specify remaining locked to a particular version of a baseline DPP pipeline (e.g., to preclude the risk that a new version of the baseline DPP pipeline operates differently with the user's customized filters, changing overall behavior). Examples run in multiple computing environments (e.g., cloud, on premises (servers), and on device), and may even span and/or share information among different environments. Customized DPP solutions may also be developed by independent software vendors (ISVs) and solution integrators (SIs).

FIG. 1 illustrates an example arrangement 100 that advantageously provides custom DPP in SR, using a customized multi-stage DPP pipeline 200. A microphone 102 (or microphone array) captures an audio input 104 comprising human speech from a speaker 106. An audio segmenter 108 segments audio input 104 into a plurality of audio segments 110, for example comprising audio segment 111, audio segment 112, audio segment 113, and others.

Plurality of audio segments 110 are provided to an SR component 120. SR component 120 recognizes elements of human speech in audio segments 111-113 and outputs a stream of tokens 130, for example comprising token 131, token 132, token 133, token 134, token 135, token 136, token 137, token 138, and token 139. Each of tokens 131-139 represents an element of human speech in a lexical language form, for example a word. Tokens 131-139 are a defined set of digital symbols that are each mapped to a recognized spoken word. In some examples tokens 131-139 may be textual representations of the spoken words.

In some examples, such as in cloud deployments and other multi-user environments, a customer identifier 122 links stream of tokens 130 (or audio input 104) to DPP pipeline 200. By linking stream of tokens 130 to DPP pipeline 200, specifically, in multi-use environments, the use of DPP pipeline 200 is limited to only the authorized user (e.g., individual person or a member of an organization) associated with customer identifier 122. In some examples, such as when SR component 120 and DPP pipeline 200 are both deployed within a single-user device, such as a user device 170, linking stream of tokens 130 to DPP pipeline 200 with customer identifier 122 may not be needed.

DPP pipeline 200 transforms lexical form of stream of tokens 130 into display form of a final text 140, and outputs a final text 140 representing stream of tokens 130. Further detail on the composition and operation of an exemplary DPP pipeline 200 is provided in relation to FIG. 2. Final text 140 is provided to a transcription service 150 that outputs a textual transcript 152 for display on a display device 160 (e.g., a video screen or a screen of user device 170. An example sentence "Meet me on $2^{nd}$ avenue at 4:30 pm" is shown in FIG. 1, in a natural language display form that may be more readable than the lexical form of "meet me on second avenue at four thirty p m". The process may be implemented by a voice assistant, transcription service, dictation service, or the like.

In some examples, arrangement 100 operates in real-time (or near-real-time) such that final text 140 is output and displayed in a streaming fashion. That is, there is a minimal lag time or latency (e.g., under five seconds) after speaker 106 utters a word into microphone 102 and that word appears within final text 140 on display device 160.

In some examples, everything shown in arrangement 100 between microphone 102 and display device 160, and described thus far, is implemented on user device 170. Some examples of user device 170 are a mobile device, such as a smartphone, a tablet computer, or a notebook computer. In some examples, one or more of audio segmenter 108, SR component 120, and transcription service 150 is located remotely from microphone 102 and/or display device 160, such as in a cloud environment (across a network 930 of FIG. 9) or in an on-premises server.

Figure 4:
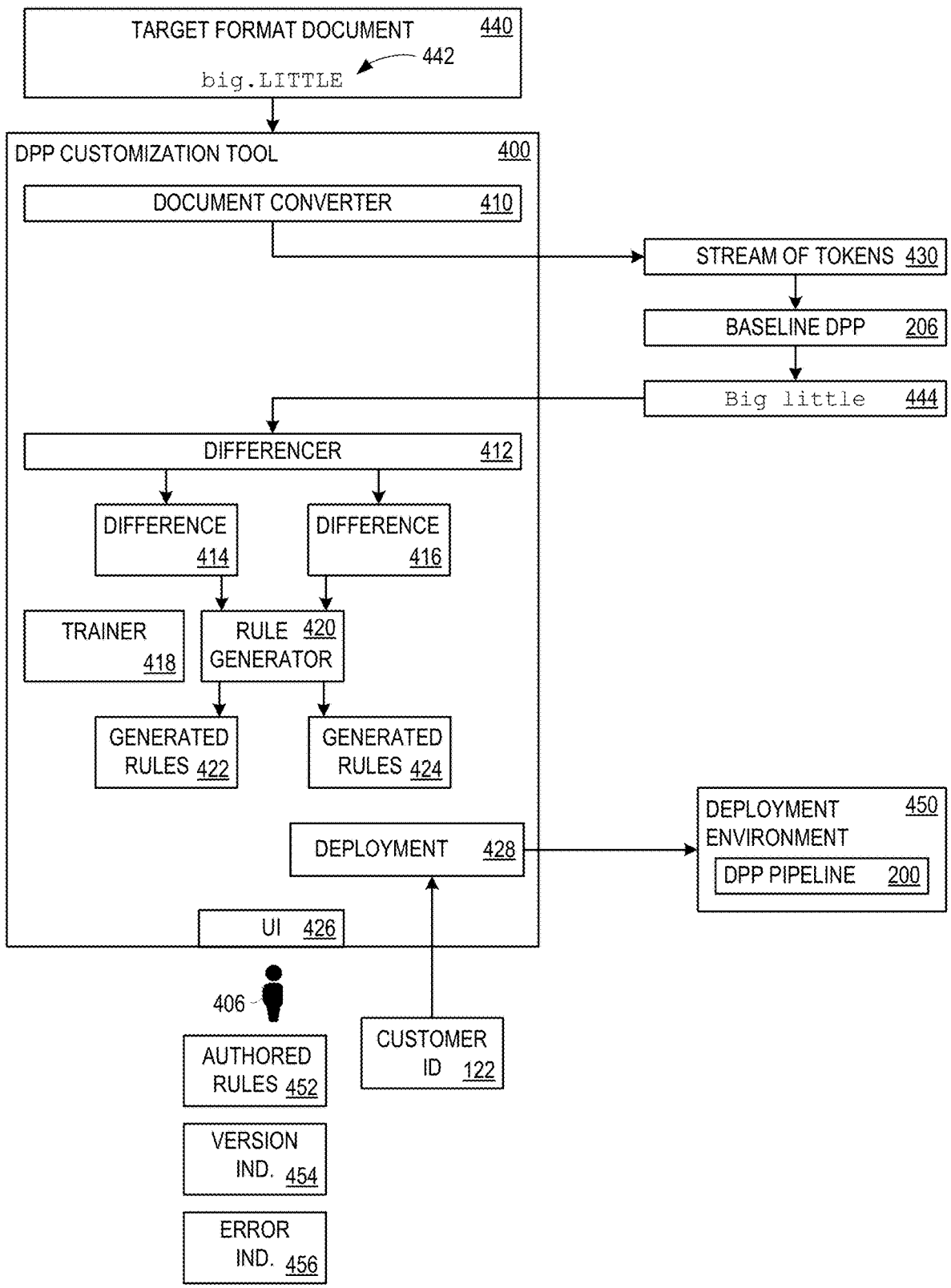
FIG. 4 illustrates a DPP pipeline customization tool that enables development and deployment of the DPP pipeline of FIG. 2 into the arrangement of FIG. 1.

A DPP pipeline customization tool 400, which is described in further detail in relation to FIG. 4, is used to customize filters of DPP pipeline 200 that are applied to a baseline DPP pipeline 206. In some examples, DPP pipeline 200 is thus a combination of customized filters (for a specific user) and a baseline DPP pipeline 206 that is common to other users.

Figure 2:
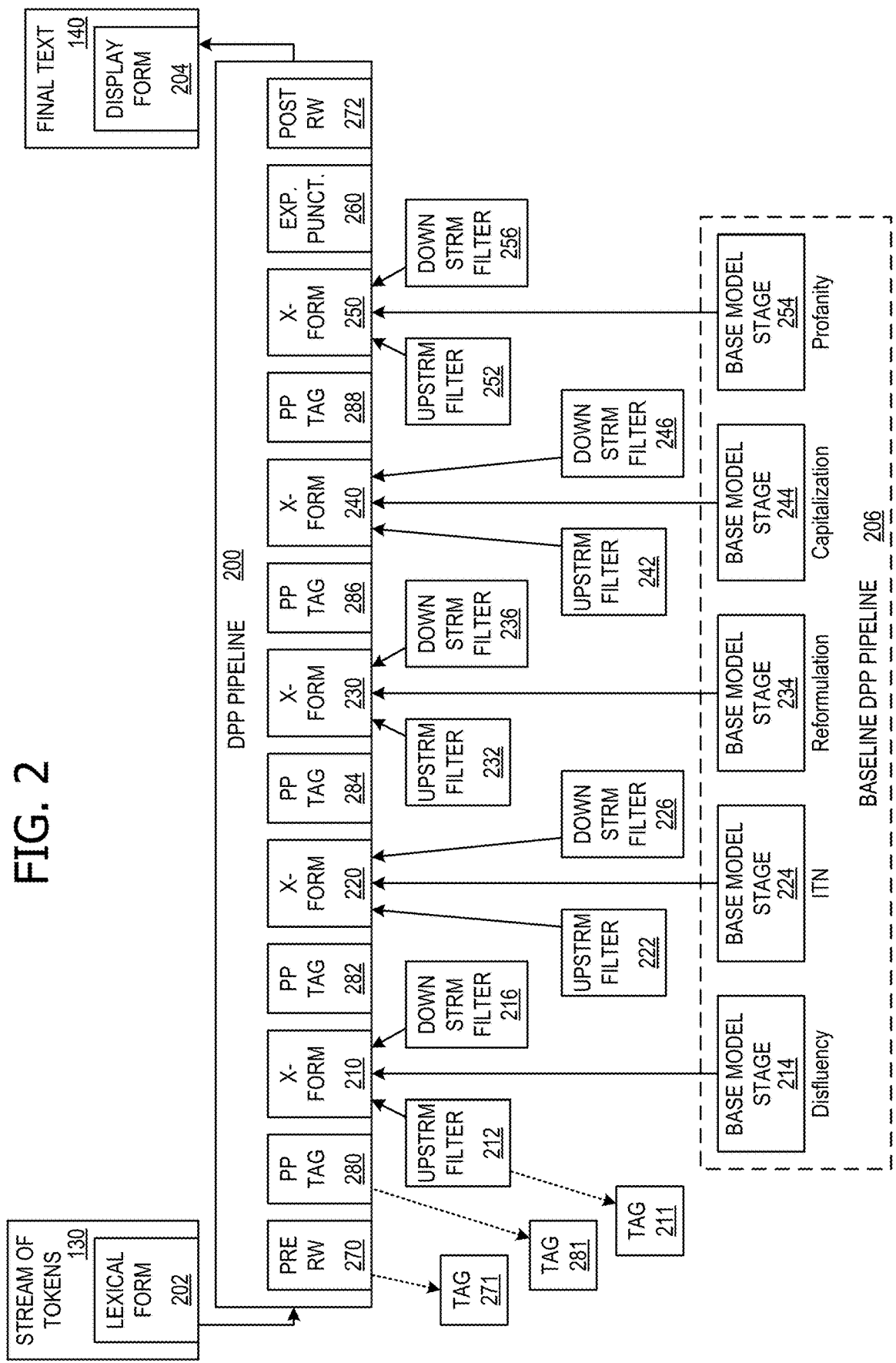
FIG. 2 illustrates an exemplary custom DPP pipeline, as may be used in the arrangement of FIG. 1.

FIG. 2 illustrates an exemplary DPP pipeline 200. DPP pipeline 200 is a customized multi-stage DPP pipeline that transforms a lexical form 202 of stream of tokens 130 into display form 204 of final text 140. In the illustrated example, DPP pipeline 200 has a global pre-rewrite stage 270, a preserve phrase tagger 280, a transformation stage 210, a preserve phrase tagger 282, a transformation stage 220, a preserve phrase tagger 284, a transformation stage 230, a preserve phrase tagger 286, a transformation stage 240, a preserve phrase tagger 288, a transformation stage 250, an explicit punctuation stage 260, and a global post-rewrite stage 272.

In some examples, transformation stage 210 performs disfluency; transformation stage 220 performs ITN; transformation stage 230 performs reformulation; transformation stage 240 performs capitalization; transformation stage 250 masks or removes objectionable words, such as profanity, and explicit punctuation stage 260 adds in punctuation, such as by replacing words that state a punctuation with the punctuation mark itself (e.g., replacing "comma" with an actual comma in final text 140).

Turning briefly to FIG. 3, an example is provided for each of disfluency, inverse text normalization (ITN), reformulation, capitalization, profanity masking, and explicit punctuation. In FIG. 3 lexical form 202 "well well g-----n too day is may twenty seven period" is provided to a disfluency stage 310 that outputs "well g-----n too day is may twenty seven period". Disfluencies are interruptions in the regular flow of speech, such as using uh and um, pausing silently, repeating words, or interrupting oneself to correct something said previously.

The output of disfluency stage 310 is fed into an ITN stage 320 that outputs "well g-----n too day is may twenty seven period", according to a user's preferred date representation. The output of ITN stage 320 is fed into a reformulation stage 330 that outputs "well g-----n today is 5/27 period", reformulating "too day" into a context-correct "today". The output of reformulation stage 330 is fed into a capitalization stage 340 that outputs "Well g-----n today is 5/27 period", by capitalizing the recognized start of a sentence. The output of capitalization stage 340 is fed into a profanity stage 350 that outputs "Well *** today is 5/27 period", masking the profane word "g-----n" with asterisks.

The output of profanity stage 350 is fed into explicit punctuation stage 260 that outputs "Well *** today is 5/27.", replacing the word "period" with the actual punctuation mark. Explicit punctuation relies on a spoken word for a punctuation mark, and is an optional operation of DPP pipeline 200. Some examples of DPP pipeline 200 use implicit punctuation, in which punctuation marks are inferred from context and pauses between spoken words.

In some examples, stages 310-350 of FIG. 3 correspond to transformation stages 210-250, respectively. However, in some examples, a different order of number of transformation stages is used in DPP pipeline 200.

Returning to FIG. 2, a baseline DPP pipeline 206 includes a base model stage 214 (e.g., disfluency or another), a base model stage 224 (e.g., ITN or another), and a base model stage 254 (e.g., profanity or another). In some examples, baseline DPP pipeline 206 also includes a base model stage 234 (e.g., reformulation or another) and a base model stage 244 (e.g., capitalization or another), although in some examples, base model stages 234 and 244 are added with customization into DPP pipeline 200 (thus becoming customized).

In some examples, disfluency reformulation, capitalization, profanity, and punctuation use rule-based filter models, and ITN uses network models for filters. An ITN filter may comprise a neural network (NN), such as a transformer NN. A transformer NN is configured to solve sequence-to-sequence tasks while handling long-range dependencies (e.g., relatively distant prior inputs), and is thus suitable to classifying long strings of SR tokens. For example, phone numbers in the USA are ten numerical digits, and so span at least ten spoken words. Transformer NNs typically rely on self-attention to compute representations of input and output without using sequence-aligned recurrent NNs (RNNs) or convolution.

Rule-based models use an upstream filter and a downstream filter, which may be viewed as a "rule escaper" and a "rule add-on" respectively, and which may be independently actuated (or omitted). An upstream filter changes the input to a base model stage, so that certain rules are disabled. This may be accomplished by tagging the related phrases in the input lexical form. A downstream filter may be similar to its corresponding base model, although it applies custom rules and removes tags inserted by the upstream filter. For example, specific profanity and capitalization rules may be supplied by a user, and disfluency may be turned on or off. In some examples, the explicit punctuation stage uses a merged model that merges base rules, user-provided add-on rules, and user-provided removal rules, although in other examples, the explicit punctuation stage also uses the upstream and downstream filter arrangement.

For ITN, the upstream filter may change the input to the base model stage in support of error correction (e.g., to ensure the lexical text is processed properly), disable certain behavior by tagging select phrases in the input lexical text, and extend functionality by directly applying ITN rules provide by a user. The downstream filter may re-format the output of the base model stage and remove tags applied by the upstream ITN filter. This enables users to leverage the common rules provided in the base model stage and add on their own domain-specific rules. For example, the ITN base model stage provides support to transcript numbers from various spoken forms, so the ITN downstream filter may easily re-format the numbers into a preferred format without separately implementing number transcription related ITN again (e.g., "1/1/1980" to "01/01/1980").

DPP pipeline 200 has a global pre-rewrite stage 270 that may change the input that is then fed into the remainder of DPP pipeline 200. For example, global pre-rewrite stage 270 may perform key word spotting (KWS) text removal rule-based recognition error correction, and or insert tags into stream of tokens 130, such as a tag 271.

DPP pipeline 200 has a preserve phrase tagger 280 that inserts a preserve phrase tag 281. In some examples, DPP pipeline 200 uses a global preserved phrase tagger that inserts tags to prevent preserve certain phrases from being processed (changed) by any stage of DPP pipeline 200. In some examples, preserve phrase taggers are unique to the immediately-following transformation stage (e.g., preserve phrase tagger 280 is unique to the immediately-following transformation stage 210), inserting tags only relevant to the immediately-following transformation stage. In some examples, the preserve phrase function is provided in each transformation stage by the upstream filter of that transformation stage. At the end of DPP pipeline 200, tagged phrases are restored to their original wording. For example, certain words may be preserved from any of disfluency, ITN, profanity masking, capitalization, and reformulation.

Transformation stage 210 has an upstream filter 212, base model stage 214, and a downstream filter 216. As indicated, upstream filter inserts a tag 211, which will be removed by downstream filter 216. A preserve phrase tagger 282 may be next, if DPP pipeline does not use a global preserve phrase tagger or perform preserve phrase tagging within upstream filters. Transformation stage 220 has an upstream filter 222, base model stage 224, and a downstream filter 226. A preserve phrase tagger 284 may be next.

Transformation stage 230 has an upstream filter 232, base model stage 234, and a downstream filter 236. A preserve phrase tagger 286 may be next. Transformation stage 240 has an upstream filter 242, base model stage 244, and a downstream filter 246. A preserve phrase tagger 288 may be next. Transformation stage 250 has an upstream filter 252, base model stage 254, and a downstream filter 256. Explicit punctuation stage 260 is next, followed (in the illustrated example) by a global post-rewrite stage 272.

Global post-rewrite stage 272 rewrites the final output of DPP pipeline 200 into final text 140. In some examples, global post-rewrite stage 272 is a model comprising a set of rewrite rules. A rewrite rule is a pair of two phrases in the form {old phrase→new phrase}. Global post-rewrite stage 272 replaces any occurrence of "old phrase" with the corresponding "new phrase" final text 140. In some examples, the matching algorithm is case insensitive and uses a greedy policy, so that if rewrite rules conflict, the one with the longer "old phrase" will prevail. In some examples, global post-rewrite stage 272 also supports grammar capitalization, such as capitalizing the first letter of a sentence, although this capitalization functionality may be disabled by a user. In some examples, global post-rewrite stage 272 also remove any remaining tags (e.g., tag 271 inserted by global pre-rewrite stage 270).

Users can independently toggle upstream and downstream filter operation for each transformation stage, as well as the global stages (pre-rewrite, post-rewrite, and preserve phrase). For a given transformation stage, the transfer function may be represented as one of:

$$D = \text{Base}(L) \qquad \text{Eq. (1)}$$

$$D = \text{Base}(UF(L)) \qquad \text{Eq. (2)}$$

$$D = DF(\text{Base}(L)) \qquad \text{Eq. (3)}$$

$$D = DF(\text{Base}(UF(L))) \qquad \text{Eq. (4)}$$

$$D = DF(LF(L)) \qquad \text{Eq. (5)}$$

where D represents display form 204, L represents lexical form 202, Base( ) represents the behavior of the base model stage, UF( ) represents the behavior of the upstream filter, and DF( ) represents the behavior of the downstream filter.

Eq. (1) is for both the upstream filter and downstream filter disabled. Eq. (2) is for the upstream filter enabled and the downstream filter disabled. Eq. (3) is for the upstream filter disabled and the downstream filter enabled. Eq. (4) is for both the upstream filter and downstream filter enabled. Eq. (5) is for both the upstream filter and downstream filter enabled, and bypassing the base model stage (which may be accomplished in some examples using tags).

FIG. 4 illustrates DPP pipeline customization tool 400 that enables development and deployment of DPP pipeline 200 of FIG. 2 into arrangement 100. A target format document 440 is fed into DPP pipeline customization tool 400 and used to enable DPP pipeline 200 to learn proper display form for user-provided in-domain unique content that is specific to that user. Text 442 of target format document 440 is converted by a document converter 410 into a stream of tokens 430 in lexical form. Stream of tokens 430 is fed into baseline DPP pipeline 206 which outputs baseline text 444 representing stream of tokens 430.

A differencer 412 determines a first difference 414 and a second difference 416 between baseline text 444 and text 442 of target format document 440. A rule generator 420 generates rules 422 for upstream filter 212 and downstream filter 216, rules 424 for upstream filter 222 and downstream filter 226, and other rules for filters of other transformation stages.

A deployment manager 428 deploys the customized filters into deployment environment 450 to produce DPP pipeline 200. In some examples, deployment environment 450 comprises a cloud resource, on premises servers, or user device 170. In some examples, such as multi-user environments, deployment manager 428 uses customer identifier 122 (which is associated with user 406) to ensure that only user 406 is able to access DPP pipeline 200.

User 406 uses a user interface 426 to accept and/or edit the generated rules (e.g., rules 422 and 424), upload authored rules 452 (written without the process described for target format document 440), and/or enter a version indication 454. Version indication 454 enables user 406 to ensure that DPP pipeline 200 will use only a specified version of baseline DPP pipeline 206 (e.g., DPP pipeline 200 is "locked"), in order to ensure stability.

In some examples, user interface 426 (or another user interface in deployment environment 450) enables user 406 to enter indication of an error 456 if user 406 notices an error in textual transcript 152. Indication of an error 456 acts as a feedback signal, which is used by a trainer 418 to improve rules or training data related to that identified error.

Figure 5:
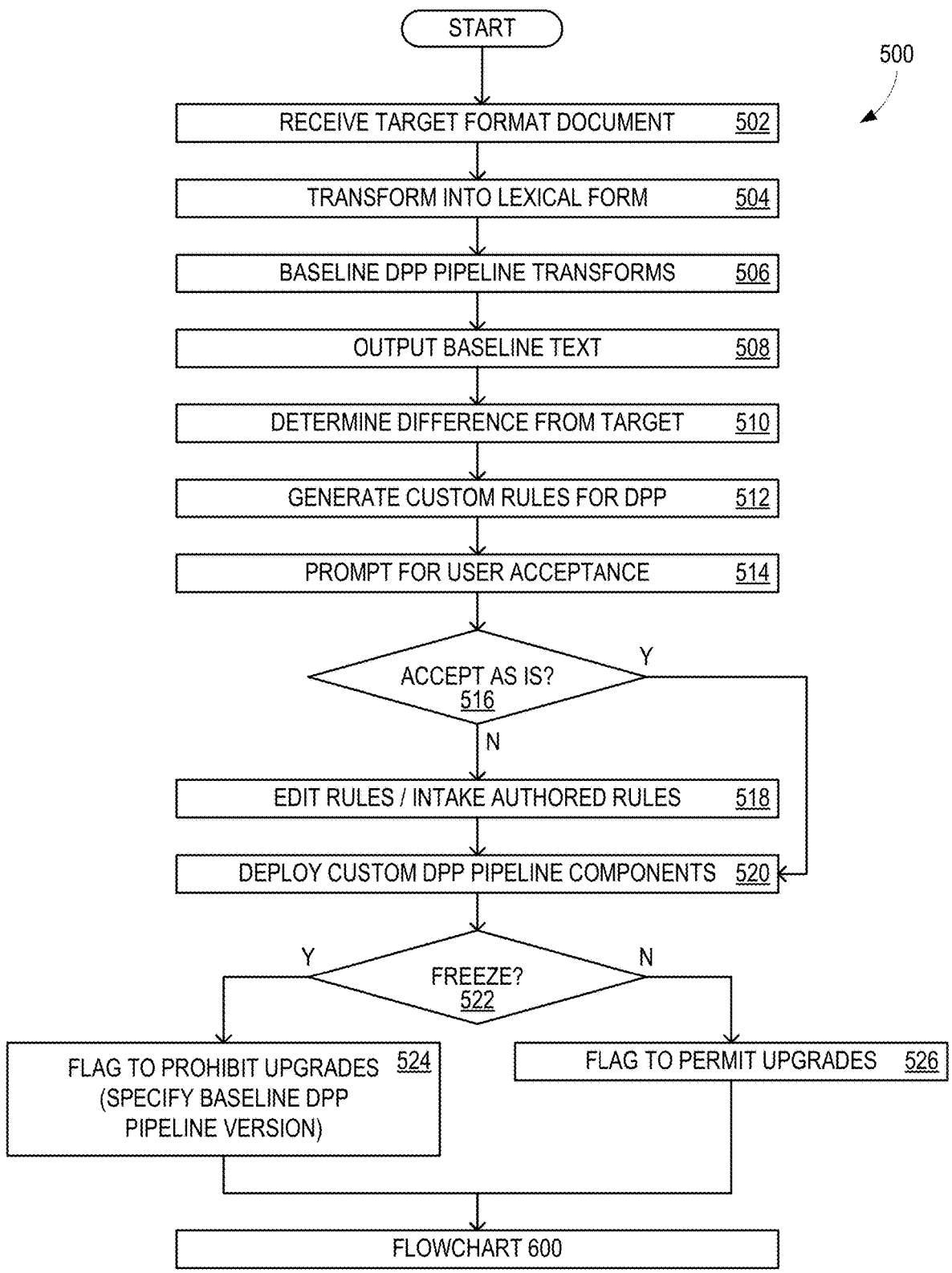
FIG. 5 shows a flowchart illustrating exemplary operations that may be performed using the DPP pipeline customization tool of FIG. 4.

FIG. 5 shows a flowchart 500 illustrating exemplary operations that may be performed using arrangement 100 and/or DPP pipeline customization tool 400. In some examples, operations described for flowchart 500 are performed by computing device 900 of FIG. 9. Flowchart 500 comprises operations 502-526 that customizes baseline (multi-stage) DPP pipeline 206 into (customized multi-stage) DPP pipeline 200. Flowchart 500 commences with operation 502, which includes receiving, by DPP pipeline customization tool 400, target format document 440.

Operation 504 transforms text 442 of target format document 440 into stream of tokens 430, each token representing an element of human speech in a lexical form.

Operation 506 includes receiving, by baseline DPP pipeline 200, stream of tokens 430 and transforming, by base model stage 214 of baseline DPP pipeline 206, a first aspect of stream of tokens 430 (e.g., disfluency) from lexical form into display form. In some examples, operation 506 also transforms a second aspect of stream of tokens 430 (e.g., ITN) from lexical form into display form with base model stage 224. In operation 508 baseline DPP pipeline 206 outputs baseline text 444 representing stream of tokens 430, based on at least transforming aspects of stream of tokens 430.

Operation 510 determines at least a first difference between baseline text 444 and text 442 of target format document 440, and in some examples, also determines a second difference. Operation 512 generates rules 422 for upstream filter 212 and downstream filter 216, based on at least the difference between baseline text 444 and text 442 of target format document 440. In some examples, operation 512 generates rules 424 for upstream filter 222 and downstream filter 226, based on at least the difference between baseline text 444 and text 442 of target format document 440.

Operation 514 provides a user interface 426 for user 406 to accept the generated rules 422 and/or 424. DPP pipeline customization tool 400 receives acceptance of the generated rules 422 and/or 424 in operation 514. Decision operation 516 determines whether all of the generated rules are accepted as-is, or instead whether they are edited or authored rules 452 are submitted by user 406. If not accepted as-is, operation 518 includes receiving (via user interface 426) authored rules 452 for at least one of: upstream filter 212, base model stage 214, downstream filter 216, upstream filter 222, base model stage 224, downstream filter 226, global pre-rewrite stage 270, global post-rewrite stage 272, or preserved phrase tagger 280. Otherwise, (e.g., if accepted as-is) flowchart 500 moves to operation 520.

Operation 520 deploys DPP pipeline 200 by deploying at least one of: upstream filter 212, base model stage 214, downstream filter 216, upstream filter 222, base model stage 224, downstream filter 226, global pre-rewrite stage 270, global post-rewrite stage 272, or preserved phrase tagger 280. In some examples, baseline DPP pipeline 206 is already in-place in deployment environment 450 (i.e., already online), and so only the customized components need to be deployed, in order to update the online default (baseline) functionality. In some examples, at least one of upstream filter 212, base model stage 214, downstream filter 216, upstream filter 222, base model stage 224, downstream filter 226, global pre-rewrite stage 270, global post-rewrite stage 272, or preserved phrase tagger 280 comprises an NN. Some examples limit dissemination of the deployed components of DPP pipeline 200 based on at least customer identifier 122.

Decision operation 522 determines whether user 406 desires a version freeze with a specified version. This is determined by whether user interface 426 receives version indication 454 to continue using an identified version of DPP pipeline 200 (e.g., freezing to the specified version of baseline DPP pipeline 206). As described above, baseline DPP pipeline 206 (the standard, default DPP pipeline) is composed of base stage models (e.g., ITN, capitalization, profanity), and user 406 is able to customize the behavior of baseline DPP pipeline 206. However, the customization of DPP pipeline 200 is defined as a deviation from the specific version of baseline DPP pipeline 206 for which the customized components (e.g., upstream and downstream filters) are developed.

When baseline DPP pipeline 206 changes, due to an update, it is possible that the deviation from the older behavior provides different results than the deviation from the updated behavior. Thus, user 406 may prefer to freeze the behavior of DPP pipeline 200 to a stable, known behavior by freezing the version of baseline DPP pipeline 206 upon which DPP pipeline 200 is based. Thus, the ability to freeze to the current version of baseline DPP pipeline 206 is provided, in some examples.

Further, some examples permit user 406 to select a particular version of baseline DPP pipeline 206 (from a plurality of recent versions) to use. This permits user 406 to freeze DPP pipeline 200 when customizing it, and then later, at some point after learning that baseline DPP pipeline 206 has been updated, user 406 applies the customizations to the updated version. In some scenarios, user 406 may prefer to skip several updates of baseline DPP pipeline 206, and update DPP pipeline 200 on a more relaxed schedule. When several intervening versions of baseline DPP pipeline 206 are available (e.g., between the specified frozen version and the most recent version), user 406 is able to select any of those versions of baseline DPP pipeline 206 to use.

To support this versioning control, operation 524 sets a flag to prohibit automatic updates of baseline DPP pipeline 206. When executing DPP pipeline 200 (during operation 606 of flowchart 600) deployment environment will use enforce versioning control by read the deployed metadata and load the corresponding base model stages of the specified baseline DPP pipeline 206 (according to version indication 454), and use the customized components (of DPP pipeline 200) together to serve SR requests. Otherwise, operation 526 sets a flag to permit automatic updates of baseline DPP pipeline 206. User 406 may now proceed to use DPP pipeline 200 according to flowchart 600 of FIG. 6.

Figure 6:
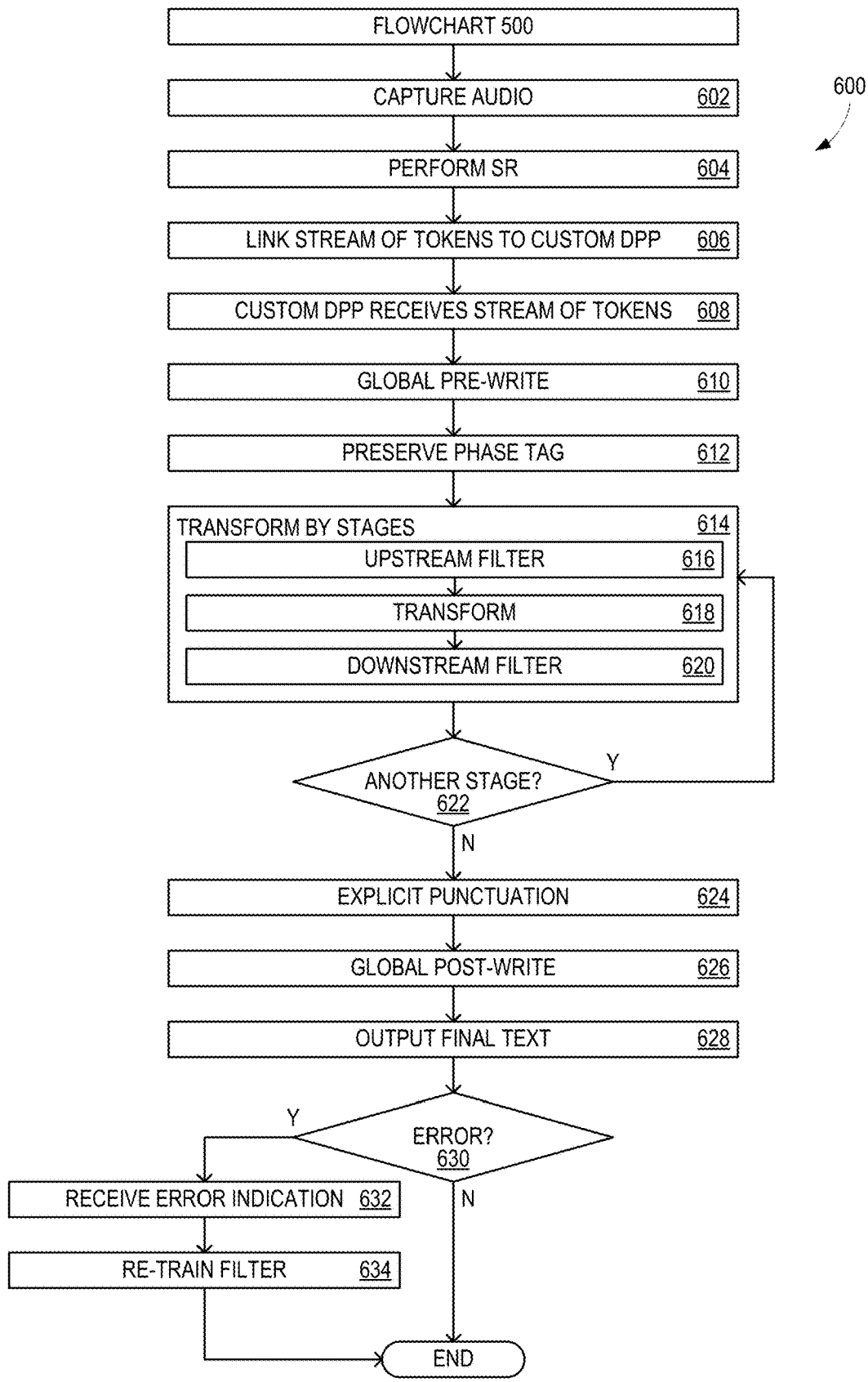
FIG. 6 shows another flowchart illustrating exemplary operations that may be performed using the arrangement of FIG. 1.

FIG. 6 shows a flowchart 600 illustrating exemplary operations that may be performed when using a customized, multi-stage DPP pipeline 200. In some examples, operations described for flowchart 600 are performed by computing device 918 of FIG. 9. Microphone 102 captures audio input 104 comprising human speech, and SR component 120 receives audio input 104 (e.g., as plurality of audio segments 110), in operation 602. SR component 120 performs an SR process on audio input 104 in operation 604, and outputs stream of tokens 130. Each token represents an element of human speech, such as a word or other element.

In some examples, operation 606 links stream of tokens 130 or audio input to DPP pipeline 200 with at least customer identifier 122. In such examples, user 406 may submit customer identifier 122 along with an SR request. Operation 608 includes receiving, by DPP pipeline 200, stream of tokens 130, each token representing an element of human speech in lexical form 202. In some examples, DPP pipeline 200 comprises at least two stages selected from the list consisting of: disfluency, ITN, reformulation, capitalization, profanity, and punctuation. In an example of a multi-user cloud setting, deployment environment 450 loads the latest customized components of DPP pipeline 200 (e.g., identified using customer identifier 122) and assembles DPP pipeline 200 model in real time using the version of baseline DPP pipeline 206 identified in version indication 454 (if the version is frozen).

Operation 610 includes, prior to receiving stream of tokens 130 by transformation stage 210, receiving stream of tokens 130 by global pre-rewrite stage 270, and performing, by global pre-rewrite stage 270, KWS text removal or rule-based recognition error correction. Operation 612 includes, prior to at least one transformation stage of DPP pipeline 200, tagging stream of tokens 130 to preserve a phrase with preserve phrase tag 281.

Operation 614, which comprises operations 616-620, is performed for transformation stage 210 of DPP pipeline 200, in which stream of tokens 130 is received, in turn, by upstream filter 212, base model stage 217, and downstream filter 216. Operation 616 alters stream of tokens 130 by upstream filter 212. In some examples, this includes tagging stream of tokens 130 or changing at least one token of stream of tokens 130.

Operation 618 transforms a first aspect (e.g., disfluency, ITN, or another) of stream of tokens 130 from lexical form into display form, by base model stage 214. Operation 620 alters stream of tokens 130 by downstream filter 216. In some examples, this includes removing a tag added by upstream filter 212, or reformatting output of base model stage 214.

Decision operation 622 determines whether there is another stage of DPP pipeline 200 (except for explicit punctuation stage 260). If so, flowchart 600 returns to operation 614. In the second pass, operation 614 receives, by transformation stage 220 from transformation stage 210, stream of tokens 130 and transforms, by transformation stage 220, a second aspect of stream of tokens 130 from lexical form into display form. In transformation stage 220, upstream filter 222, base model stage 224, and downstream filter 226 receive stream of tokens 130 in turn. Operation 616 alters stream of tokens 130 by upstream filter 222; operation 618 transforms the second aspect of stream of tokens 130 from lexical form into display form by base model stage 224; and operation 620 alters stream of tokens 130 by downstream filter 226. Other transformation stages 230-250 also transform aspects of stream of tokens 130 according to their respective functionality. After transformation stages 210-250 are complete, operation 624 performs explicit punctuation transformation with explicit punctuation stage 260 (although some examples use the three part transformation stage with the upstream and downstream filters and the base model stage).

After DPP pipeline 200 transforms the second aspect (and other aspects) of stream of tokens 130, global post-rewrite stage 272 receives stream of tokens 130 in operation 626. Operation 626 also includes rewriting, by global post-rewrite stage 272, an output of a final transformation stage of DPP pipeline 200 (e.g., explicit punctuation stage 260 or another transformation stage). In some examples, this includes removing preserve phrase tag 281 (if it had not been removed earlier) from stream of tokens 130, and replacing phrases.

Operation 628 outputs final text 140, representing stream of tokens 130, based on at least transforming multiple aspects of stream of tokens 130. In some examples, outputting final text 140 comprises outputting final text 140 as a streaming output. In some examples, outputting final text 140 comprises outputting final text 140 as textual transcript 152 and/or on display device 160. In some examples, textual transcript 152 is output on display device 160. In some examples, microphone 102 that captures audio input 104, SR component 120, DPP pipeline 200, and display device 160 are all disposed on a common user device 170 (e.g., a mobile device). In some examples, transforming stream of tokens 130 from lexical form 202 into display form 204 is performed without use of a network connection (e.g., without use of the Internet). In some examples, DPP pipeline 200 is located across computer network 930 from microphone 102 and/or display device 160.

While DPP pipeline 200 is being employed (e.g., while generating textual transcript 152), decision operation 630 determines whether indication of an error 456 is received (e.g., from user 406). If so, operation 632 includes receiving an indication of an error in final text 140 (e.g., receiving indication of an error 456). Operation 634 includes, based on at least the indication of an error in final text 140, training upstream filter 212 and/or downstream filter 216 with trainer 418.

Figure 7:
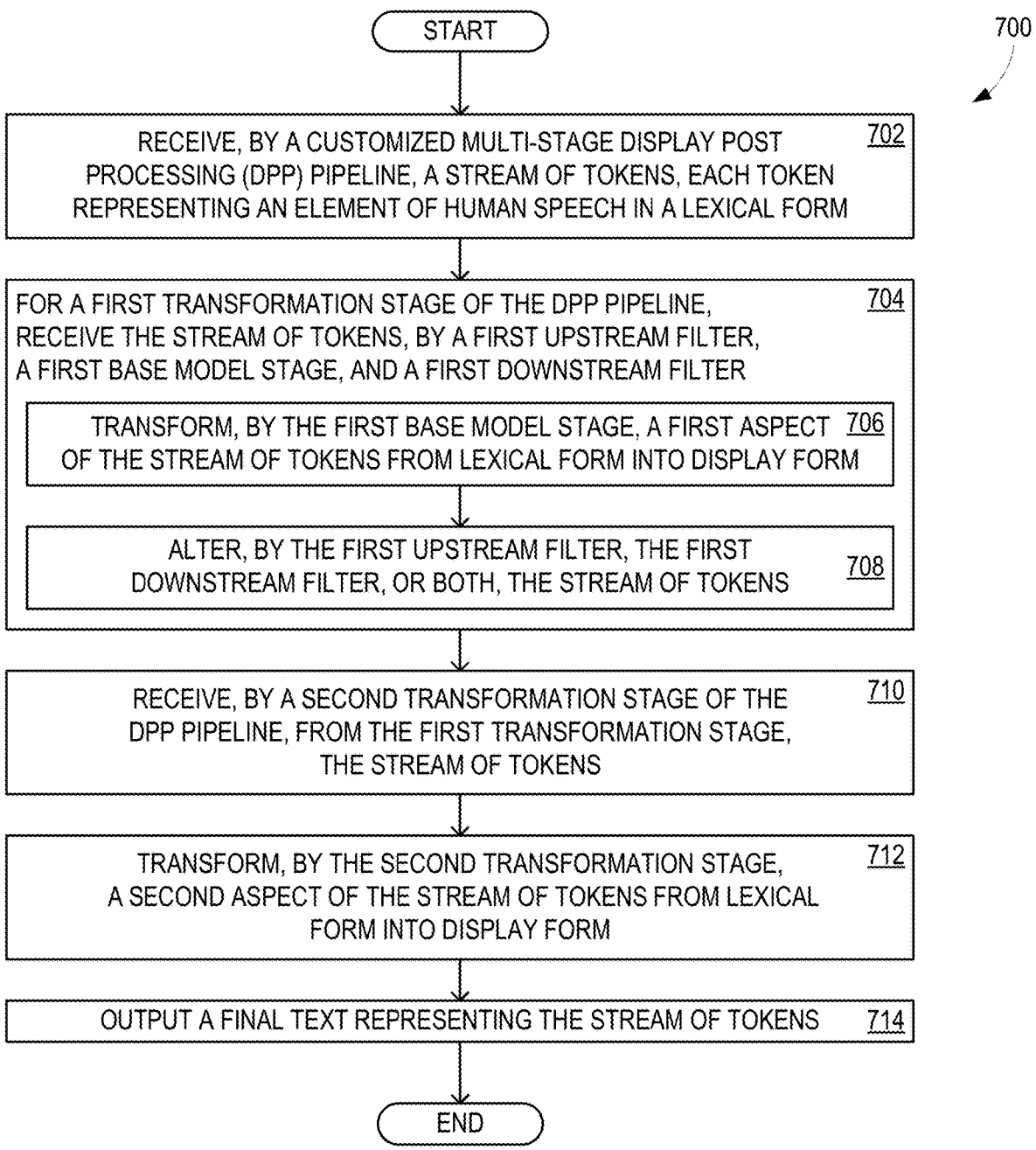
FIG. 7 shows another flowchart illustrating exemplary operations that may be performed using the arrangement of FIG. 1.

FIG. 7 is a flowchart 700 illustrating exemplary operations associated with arrangement 100. In some examples, operations described for flowchart 700 are performed by computing device 900 of FIG. 9. Flowchart 700 commences with operation 702, which includes receiving, by a customized multi-stage DPP pipeline, a stream of tokens, each token representing an element of human speech in a lexical form.

Operation 704 is performed using operations 706 and 708, and includes, for a first transformation stage of the DPP pipeline, receiving the stream of tokens, in turn, by a first upstream filter, a first base model stage, and a first downstream filter. Operation 706 includes transforming, by the first base model stage, a first aspect of the stream of tokens from lexical form into display form. Operation 708 includes altering, by the first upstream filter, the first downstream filter, or both, the stream of tokens.

Operation 710 includes receiving, by a second transformation stage of the DPP pipeline, from the first transformation stage, the stream of tokens. Operation 712 includes transforming, by the second transformation stage, a second aspect of the stream of tokens from lexical form into display form. Operation 714 includes (based on at least transforming multiple aspects of the stream of tokens) outputting a final text representing the stream of tokens.

Figure 8:
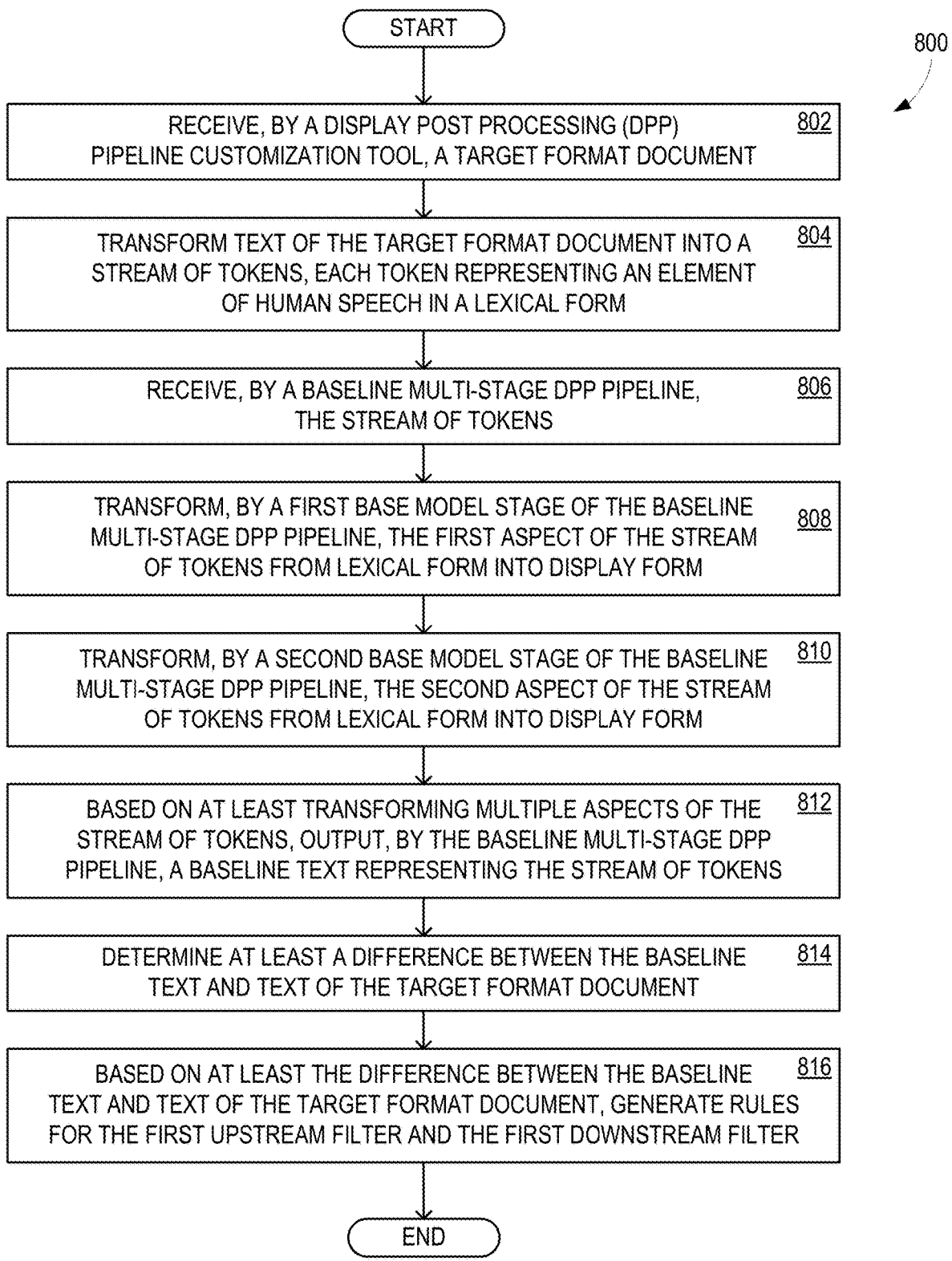
FIG. 8 shows another flowchart illustrating exemplary operations that may be performed using the arrangement of FIG. 4.

FIG. 8 is a flowchart 800 illustrating exemplary operations associated with arrangement 100. In some examples, operations described for flowchart 800 are performed by computing device 900 of FIG. 9. Flowchart 800 commences with operation 802, which includes receiving, by a DPP pipeline customization tool, a target format document. Operation 804 includes transforming text of the target format document into a stream of tokens, each token representing an element of human speech in a lexical form.

Operation 806 includes receiving, by a baseline multi-stage DPP pipeline, the stream of tokens. Operation 808 includes transforming, by a first base model stage of the baseline multi-stage DPP pipeline, the first aspect of the stream of tokens from lexical form into display form. Operation 810 includes transforming, by a second base model stage of the baseline multi-stage DPP pipeline, the second aspect of the stream of tokens from lexical form into display form.

Operation 812 includes, based on at least transforming multiple aspects of the stream of tokens, outputting, by the baseline multi-stage DPP pipeline, a baseline text representing the stream of tokens. Operation 814 includes determining at least a difference between the baseline text and text of the target format document. Operation 816 includes, based on at least the difference between the baseline text and text of the target format document, generating rules for the first upstream filter and the first downstream filter.

Additional Examples

An example system comprises: a processor; and a computer-readable medium storing instructions that are operative upon execution by the processor to: receive, by a customized multi-stage display post processing (DPP) pipeline, a stream of tokens, each token representing an element of human speech in a lexical form; for a first transformation stage of the DPP pipeline, receive the stream of tokens (in turn), by a first upstream filter, a first base model stage, and a first downstream filter, and: transform, by the first base model stage, a first aspect of the stream of tokens from lexical form into display form; and alter, by the first upstream filter and/or the first downstream filter, the stream of tokens; receive, by a second transformation stage of the DPP pipeline, from the first transformation stage, the stream of tokens; transform, by the second transformation stage, a second aspect of the stream of tokens from lexical form into display form; and based on at least transforming multiple aspects of the stream of tokens, output a final text representing the stream of tokens.

An example computerized method comprises: receiving, by a customized multi-stage display post processing (DPP) pipeline, a stream of tokens, each token representing an element of human speech in a lexical form; for a first transformation stage of the DPP pipeline, receiving the stream of tokens (in turn), by a first upstream filter, a first base model stage, and a first downstream filter, and: transforming, by the first base model stage, a first aspect of the stream of tokens from lexical form into display form; and altering, by the first upstream filter and/or the first downstream filter, the stream of tokens; receiving, by a second transformation stage of the DPP pipeline, from the first transformation stage, the stream of tokens; transforming, by the second transformation stage, a second aspect of the stream of tokens from lexical form into display form; and based on at least transforming multiple aspects of the stream of tokens, outputting a final text representing the stream of tokens.

One or more example computer storage devices have computer-executable instructions stored thereon, which, on execution by a computer, cause the computer to perform operations comprising: receiving, by a customized multi-stage display post processing (DPP) pipeline, a stream of tokens, each token representing an element of human speech in a lexical form; for a first transformation stage of the DPP pipeline, receiving the stream of tokens, by a first upstream filter, a first base model stage, and a first downstream filter, and: transforming, by the first base model stage, a first aspect of the stream of tokens from lexical form into display form; and altering, by the first upstream filter and/or the first downstream filter, the stream of tokens; receiving, by a second transformation stage of the DPP pipeline, from the first transformation stage, the stream of tokens; transforming, by the second transformation stage, a second aspect of the stream of tokens from lexical form into display form; and based on at least transforming multiple aspects of the stream of tokens, outputting a final text representing the stream of tokens.

Another example computerized method comprises: receiving, by a DPP pipeline customization tool, a target format document; transforming text of the target format document into a stream of tokens, each token representing an element of human speech in a lexical form; receiving, by a baseline multi-stage DPP pipeline, the stream of tokens; transforming, by a first base model stage of the baseline multi-stage DPP pipeline, the first aspect of the stream of tokens from lexical form into display form; transforming, by a second base model stage of the baseline multi-stage DPP pipeline, the second aspect of the stream of tokens from lexical form into display form; based on at least transforming multiple aspects of the stream of tokens, outputting, by the baseline multi-stage DPP pipeline, a baseline text representing the stream of tokens; determining at least a difference between the baseline text and text of the target format document; and based on at least the difference between the baseline text and text of the target format document, generating rules for the first upstream filter and the first downstream filter. This additional example method may further be implemented on a system with a processor and a computer-readable medium, and/or on one or more computer storage devices.

Alternatively, or in addition to the other examples described herein, examples include any combination of the following:

- transforming the second aspect of the stream of tokens from lexical form into display form comprises, for the second transformation stage, receiving the stream of tokens, by a second upstream filter, a second base model stage, and a second downstream filter;
- transforming, by the second base model stage, the second aspect of the stream of tokens from lexical form into display form;
- altering, by the second upstream filter and/or the second downstream filter, the stream of tokens;
- altering the stream of tokens by the first upstream filter comprises tagging the stream of tokens;
- altering the stream of tokens by the first upstream filter comprises changing at least one token of the stream of tokens;
- altering the stream of tokens by the first downstream filter comprises removing a tag added by the first upstream filter;
- altering the stream of tokens by the first downstream filter comprises reformatting output of the first base model stage;
- the DPP pipeline comprises at least two stages selected from the list consisting of disfluency, ITN, reformulation, capitalization, profanity, and punctuation;
- prior to receiving the stream of tokens by the first transformation stage, receiving the stream of tokens by a global pre-rewrite stage;
- performing, by the global pre-rewrite stage, KWS text removal or rule-based recognition error correction;
- after transforming the second aspect of the stream of tokens by the second transformation stage, receiving the stream of tokens by a global post-rewrite stage;
- rewriting, by the global post-rewrite stage, an output of a final transformation stage of the DPP pipeline;
- prior to at least one transformation stage of the DPP pipeline, tagging the stream of tokens to preserve a phrase with a preserve phrase tag;
- removing the preserve phrase tag from the stream of tokens;
- capturing an audio input comprising human speech;
- receiving, by an SR component, the audio input;
- performing, by the SR component, an SR process on the audio input;
- outputting, by the SR component, the stream of tokens;
- at least one of the first upstream filter, the first base model stage, the first downstream filter, the second upstream filter, the second base model stage, the second downstream filter, the global pre-rewrite stage, the global post-rewrite stage, or the preserved phrase tagger comprises an NN;
- outputting the final text comprises outputting the final text as a streaming output;
- outputting the final text as a textual transcript;
- outputting the final text on a display device;
- outputting the textual transcript on a display device;
- the microphone that captures the audio input, the SR component, the DPP pipeline, and the display device are all disposed on a common mobile device;

transforming the stream of tokens from lexical form into display form is performed without use of an internet connection;

the DPP pipeline is located across a computer network from the microphone that captures the audio input and/or the display device;

determining at least a second difference between the baseline text and text of the target format document;

based on at least the second difference between the baseline text and text of the target format document, generating rules for the second upstream filter and the second downstream filter.

providing a user interface for a user to accept the generated rules or input authored rules;

receiving acceptance of the generated rules;

receiving authored rules for at least one of: the first upstream filter, the first base model stage, the first downstream filter, the second upstream filter, the second base model stage, the second downstream filter, the global pre-rewrite stage, the global post-rewrite stage, or the preserved phrase tagger;

customizing the baseline multi-stage DPP pipeline into the customized multi-stage DPP pipeline;

customizing the baseline multi-stage DPP pipeline comprises deploying at least one of: the first upstream filter, the first base model stage, the first downstream filter, the second upstream filter, the second base model stage, the second downstream filter, the global pre-rewrite stage, the global post-rewrite stage, or the preserved phrase tagger;

linking the stream of tokens or audio input to the customized multi-stage DPP pipeline with at least a customer identifier;

limiting dissemination of the deployed components of the customized multi-stage DPP pipeline based on at least the customer identifier;

receiving an indication to continue using an identified version of a DPP pipeline;

receiving an indication of an error in the final text; and based on at least the indication of an error in the final text, training the first upstream filter and/or the first downstream filter.

While the aspects of the disclosure have been described in terms of various examples with their associated operations, a person skilled in the art would appreciate that a combination of operations from any number of different examples is also within scope of the aspects of the disclosure.

Example Operating Environment

Figure 9:
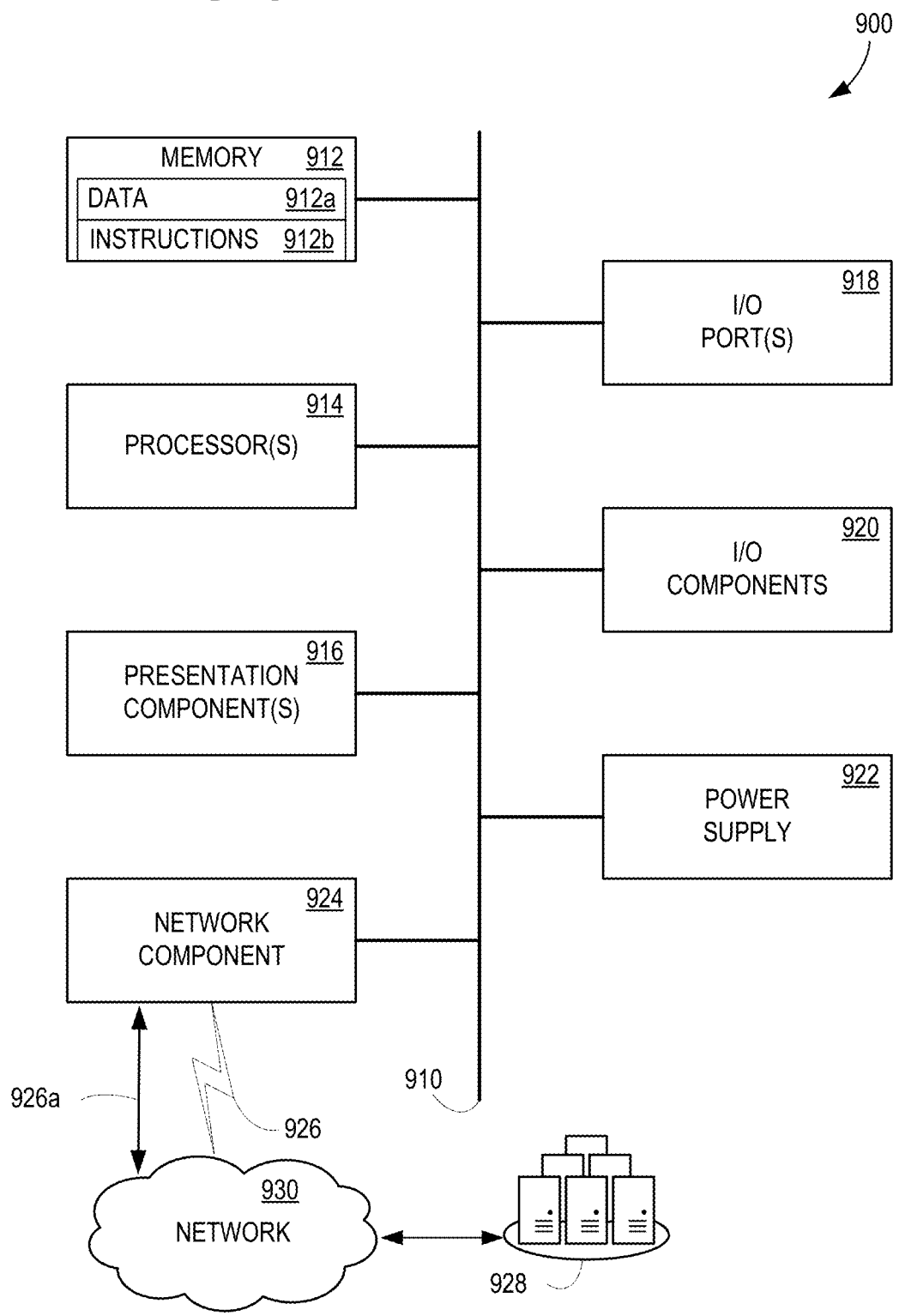
FIG. 9 is a block diagram of an example computing environment suitable for implementing some of the various examples disclosed herein.

FIG. 9 is a block diagram of an example computing device 900 for implementing aspects disclosed herein, and is designated generally as computing device 900. In some examples, one or more computing devices 900 are provided for an on-premises computing solution. In some examples, one or more computing devices 900 are provided as a cloud computing solution. In some examples, a combination of on-premises and cloud computing solutions are used. Computing device 900 is but one example of a suitable computing environment and is not intended to suggest any limitation as to the scope of use or functionality of the examples disclosed herein, whether used singly or as part of a larger set.

Neither should computing device 900 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 900 includes a bus 910 that directly or indirectly couples the following devices: computer storage memory 912, one or more processors 914, one or more presentation components 916, input/output (I/O) ports 918, I/O components 920, a power supply 922, and a network component 924. While computing device 900 is depicted as a seemingly single device, multiple computing devices 900 may work together and share the depicted device resources. For example, memory 912 may be distributed across multiple devices, and processor(s) 914 may be housed with different devices.

Bus 910 represents what may be one or more busses (such as an address bus, data bus, or a combination thereof). Although the various blocks of FIG. 9 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 9 and the references herein to a "computing device." Memory 912 may take the form of the computer storage media referenced below and operatively provide storage of computer-readable instructions, data structures, program modules and other data for the computing device 900. In some examples, memory 912 stores one or more of an operating system, a universal application platform, or other program modules and program data. Memory 912 is thus able to store and access data 912a and instructions 912b that are executable by processor 914 and configured to carry out the various operations disclosed herein.

In some examples, memory 912 includes computer storage media. Memory 912 may include any quantity of memory associated with or accessible by the computing device 900. Memory 912 may be internal to the computing device 900 (as shown in FIG. 9), external to the computing device 900 (not shown), or both (not shown). Additionally, or alternatively, the memory 912 may be distributed across multiple computing devices 900, for example, in a virtualized environment in which instruction processing is carried out on multiple computing devices 900. For the purposes of this disclosure, "computer storage media," "computer-storage memory," "memory," and "memory devices" are synonymous terms for the computer-storage memory 912, and none of these terms include carrier waves or propagating signaling.

Processor(s) 914 may include any quantity of processing units that read data from various entities, such as memory 912 or I/O components 920. Specifically, processor(s) 914 are programmed to execute computer-executable instructions for implementing aspects of the disclosure. The instructions may be performed by the processor, by multiple processors within the computing device 900, or by a processor external to the client computing device 900. In some examples, the processor(s) 914 are programmed to execute instructions such as those illustrated in the flow charts discussed below and depicted in the accompanying drawings. Moreover, in some examples, the processor(s) 914 represent an implementation of analog techniques to perform the operations described herein. For example, the operations may be performed by an analog client computing device 900 and/or a digital client computing device 900. Presentation component(s) 916 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 900, across a wired connection, or in other ways. I/O ports 918 allow computing device 900 to be logically coupled to other devices including I/O components 920, some of which may be built in. Example I/O components 920 include, for example but without limitation, a microphone, joystick, game pad, satellite dish, scanner, printer, wireless device, etc.

Computing device 900 may operate in a networked environment via the network component 924 using logical connections to one or more remote computers. In some examples, the network component 924 includes a network interface card and/or computer-executable instructions (e.g., a driver) for operating the network interface card. Communication between the computing device 900 and other devices may occur using any protocol or mechanism over any wired or wireless connection. In some examples, network component 924 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 924 communicates over wireless communication link 926 and/or a wired communication link 926a to a remote resource 928 (e.g., a cloud resource) across network 930. Various different examples of communication links 926 and 926a include a wireless connection, a wired connection, and/or a dedicated link, and in some examples, at least a portion is routed through the internet.

Although described in connection with an example computing device 900, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
a processor; and
a computer-readable medium storing instructions that are operative upon execution by the processor to:
receive, by a customized multi-stage display post processing (DPP) pipeline, a first stream of tokens, each token representing an element of human speech in a lexical form;
for a first transformation stage of the DPP pipeline, receive the first stream of tokens, by a first upstream filter, a first base model stage, and a first downstream filter, wherein at least one of the first upstream filter or the first downstream filter is rules-based, and:
transform, by the first transformation stage of the DPP pipeline, a first aspect of the first stream of tokens from lexical form into display form; and
alter, by the first upstream filter, the first downstream filter, or both, the first stream of tokens;
receive, by a second transformation stage of the DPP pipeline, from the first transformation stage, the first stream of tokens;
transform, by the second transformation stage of the DPP pipeline, a second aspect of the first stream of tokens from lexical form into display form;
output a final text representing the transformed first stream of tokens; and
provide a user interface that enables a user to at least one of accept or edit a filter rule utilized by at least one of the first upstream filter or the first downstream filter.

2. The system of claim 1, wherein providing the user interface comprises enabling the user to at least one of accept a generated rule, edit a generated rule, or upload an authored rule using the user interface.

3. The system of claim 1, wherein providing the user interface comprises enabling the user to, using the user interface, at least one of:
enter a version indication to continue using an identified version of the DPP pipeline; or
at least one of freeze or lock to the identified version of the DPP pipeline.

4. The system of claim 1, wherein providing the user interface comprises enabling the user to enter, using the user interface, an indication of an error in at least one of the final text or a textual transcript.

5. The system of claim 1, wherein providing the user interface comprises enabling the user to enter, using the user interface, an indication of an error in at least one of the final text or a textual transcript, wherein the instructions are further operative to, based on at least the indication of the error, train at least one of the first upstream filter or the first downstream filter.

6. The system of claim 1, wherein the instructions are further operative to:
transform text of a target format document into a second stream of tokens, each token representing an element of human speech in a lexical form; and
based on at least a difference between the text of the target format document and a baseline text representing the second stream of tokens, generate a rule for at least one of the first upstream filter or the first downstream filter.

7. The system of claim 1, wherein the final text comprises at least one of a textual transcript or a streaming output.

8. The system of claim 1, wherein the filter rule comprises at least one of a disfluency rule, a text normalization rule, an inverse text normalization rule, a capitalization rule, a punctuation rule, a profanity rule, or a reformulation rule.

9. A computerized method comprising:
receiving, by a customized multi-stage display post processing (DPP) pipeline, a first stream of tokens, each token representing an element of human speech in a lexical form;
for a first transformation stage of the DPP pipeline, receiving the first stream of tokens, by a first upstream filter, a first base model stage, and a first downstream filter, wherein at least one of the first upstream filter or the first downstream filter is rules-based, and:
transforming, by the first transformation stage, a first aspect of the first stream of tokens from lexical form into display form; and
altering, by the first upstream filter, the first downstream filter, or both, the first stream of tokens;
receiving, by a second transformation stage of the DPP pipeline, from the first transformation stage, the first stream of tokens;
transforming, by the second transformation stage of the DPP pipeline, a second aspect of the first stream of tokens from lexical form into display form;
outputting a final text representing the transformed first stream of tokens; and
providing a user interface that enables a user to at least one of accept or edit a filter rule utilized by at least one of the first upstream filter or the first downstream filter.

10. The method of claim 9, wherein providing the user interface comprises enabling the user to at least one of accept a generated rule, edit a generated rule, or upload an authored rule using the user interface.

11. The method of claim 9, wherein providing the user interface comprises enabling the user to, using the user interface, at least one of:
enter a version indication to continue using an identified version of the DPP pipeline; or
at least one of freeze or lock to the identified version of the DPP pipeline.

12. The method of claim 9, wherein providing the user interface comprises enabling the user to enter, using the user interface, an indication of an error in at least one of the final text or a textual transcript.

13. The method of claim 9, wherein providing the user interface comprises enabling the user to enter, using the user interface, an indication of an error in at least one of the final text or a textual transcript, wherein the method further comprises, based on at least the indication of the error, training at least one of the first upstream filter or the first downstream filter.

14. The method of claim 9, further comprising:
transforming text of a target format document into a second stream of tokens, each token representing an element of human speech in a lexical form; and based on at least a difference between the text of the target format document and a baseline text representing the second stream of tokens, generating a rule for at least one of the first upstream filter or the first downstream filter.

15. The method of claim 9, wherein the final text comprises at least one of a textual transcript or a streaming output.

16. One or more computer storage media having computer-executable instructions stored thereon, which, on execution by a computer, cause the computer to perform operations comprising:
 receiving, by a customized multi-stage display post processing (DPP) pipeline, a first stream of tokens, each token representing an element of human speech in a lexical form;
 for a first transformation stage of the DPP pipeline, receiving the first stream of tokens, by a first upstream filter, a first transformation stage, and a first downstream filter, wherein at least one of the first upstream filter or the first downstream filter is rules-based, and:
  transforming, by the first transformation stage, a first aspect of the first stream of tokens from lexical form into display form; and
  altering, by the first upstream filter, the first downstream filter, or both, the first stream of tokens;
 receiving, by a second transformation stage of the DPP pipeline, from the first transformation stage, the first stream of tokens;
 transforming, by the second transformation stage of the DPP pipeline, a second aspect of the first stream of tokens from lexical form into display form;
 outputting a final text representing the transformed first stream of tokens; and
 providing a user interface that enables a user to at least one of accept or edit a filter rule utilized by at least one of the first upstream filter or the first downstream filter.

17. The one or more computer storage media of claim 16, wherein providing the user interface comprises enabling the user to at least one of accept a generated rule, edit a generated rule, or upload an authored rule using the user interface.

18. The one or more computer storage media of claim 16, wherein providing the user interface comprises enabling the user to, using the user interface, at least one of:
 enter a version indication to continue using an identified version of the DPP pipeline; or
 at least one of freeze or lock to the identified version of the DPP pipeline.

19. The one or more computer storage media of claim 16, wherein providing the user interface comprises enabling the user to enter, using the user interface, an indication of an error in at least one of the final text or a textual transcript, wherein the operations further comprise, based on at least the indication of the error, training at least one of the first upstream filter or the first downstream filter.

20. The one or more computer storage media of claim 16, wherein the operations further comprise:
 transforming text of a target format document into a second stream of tokens, each token representing an element of human speech in a lexical form; and
 based on at least a difference between the text of the target format document and a baseline text representing the second stream of tokens, generating a rule for at least one of the first upstream filter or the first downstream filter.

* * * * *